(12) United States Patent
Blandy

(10) Patent No.: US 6,249,912 B1
(45) Date of Patent: Jun. 19, 2001

(54) METHOD AND APPARATUS FOR DETERMINING MOST RECENTLY USED METHODS

(75) Inventor: Geoffrey Owen Blandy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/425,338

(22) Filed: Oct. 22, 1999

Related U.S. Application Data

(62) Division of application No. 09/078,932, filed on May 14, 1998.

(51) Int. Cl.$^7$ ................................................ G06F 9/45
(52) U.S. Cl. ............................................. 717/9; 717/5
(58) Field of Search ........................ 717/9, 5; 711/133, 711/136, 134

(56) References Cited

U.S. PATENT DOCUMENTS

| | | | |
|---|---|---|---|
| 4,008,460 | 2/1977 | Bryant et al. ................... | 711/136 |
| 4,168,541 | 9/1979 | DeKarske ......................... | 365/49 |
| 4,432,051 | * 2/1984 | Bogaert et al. .................. | 717/4 |
| 4,455,602 | 6/1984 | Baxter, III et al. .............. | 710/5 |
| 4,607,331 | 8/1986 | Goodrich, Jr. et al. .......... | 711/136 |
| 5,212,794 | * 5/1993 | Pettis et al. ..................... | 717/9 |
| 5,224,217 | 6/1993 | Zangenehpour ................... | 711/136 |
| 5,287,508 | * 2/1994 | Hejna, Jr. et al. .............. | 709/102 |
| 5,297,248 | * 3/1994 | Clark ............................. | 365/140 |
| 5,526,511 | 6/1996 | Swenson et al. ................. | 711/134 |
| 5,548,742 | 8/1996 | Wang et al. ..................... | 711/128 |
| 5,701,489 | * 12/1997 | Bates et al. ..................... | 717/5 |
| 5,754,766 | 5/1998 | Shaw et al. ..................... | 709/200 |
| 5,809,528 | 9/1998 | Miller et al. .................... | 711/136 |
| 5,857,097 | * 2/1999 | Henzinger et al. .............. | 712/236 |
| 5,909,566 | 6/1999 | Cai et al. ........................ | 712/207 |
| 5,999,737 | * 12/1999 | Srivastava ....................... | 717/9 |
| 6,002,875 | * 12/1999 | Stolberg .......................... | 717/9 |
| 6,009,514 | * 12/1999 | Henzinger et al. .............. | 712/236 |
| 6,112,317 | * 8/2000 | Berc et al. ...................... | 714/47 |

* cited by examiner

*Primary Examiner*—Mark R. Powell
*Assistant Examiner*—Chameli C. Das
(74) *Attorney, Agent, or Firm*—Duke W. Yee; Jeffrey S. LaBaw

(57) ABSTRACT

A method in a data processing system for identifying recently used methods from a plurality of methods in a data processing system, wherein a counter is associated with each method within the plurality of methods. Periodic monitoring is performed to identify an executing method in a current period. The counter is divided using a number of periods since a last period during which the executing method was executed.

7 Claims, 3 Drawing Sheets

METHOD AND APPARATUS FOR DETERMINING MOST RECENTLY USED METHODS

This application is a division of 09/078,932 filed on May 14, 1998.

BACKGROUND OF THE INVENTION

1. Technical Field

The present invention relates generally to an improved data processing system and in particular to a method and apparatus for predicting how frequently a routine may be executed in a data processing system. Still more particularly, the present invention provides a method and apparatus for predicting how frequently a method may be executed in a data processing system by determining most recently used methods in the data processing system.

2. Description of Related Art

Java is an object oriented programming language and environment that is designed to solve a number of problems in modern programming practice. Java is able to support applications for many types of data processing systems, which may contain a variety of central processing units and operating systems architectures. To enable a Java application to execute on different types of data processing systems, a compiler typically generates an architecture—neutral file format—the compiled code is executable on many processors, given the presence of the Java run time system. The Java compiler generates bytecode instructions that are non-specific to a particular computer architecture. A bytecode is a machine independent code generated by the Java compiler and executed by a Java interpreter. A Java interpreter is a module that alternatively decodes and executes a bytecode or bytecodes. These bytecode instructions are designed to be easy to interpret on any machine and easily translated on the fly into native machine code.

Selective just in time (JIT) compilation is a recent and important development in Java. Tremendous storage savings can be achieved by compiling only the most frequently executed methods. Additionally, compile time is not wasted on infrequently executed methods. For example, there are many Java methods that are executed only once if at all in a given session and it would take much more time to compile and run all of these than to just interpret them. With JIT compilation, however, one issue that remains is selecting a process for determining which methods are frequently executed methods. In addition, it would be desirable to determine which methods are frequently and recently executed methods.

Therefore, it would be advantageous to have an improved method and apparatus for identifying the most frequently recently executed methods.

SUMMARY OF THE INVENTION

It is one object of the present invention to provide an improved data processing system.

It is another object of the present invention to provide a method and apparatus for predicting how frequently a routine may be executed in a data processing system.

It is yet another object of the present invention for predicting how frequently a method may be executed in a data processing system by determining most recently used methods in the data processing system.

The present invention provides a method in a data processing system for identifying recently used methods from a plurality of methods in a data processing system, wherein a counter is associated with each method within the plurality of methods. Periodic monitoring is performed to identify an executing method in a current period. The counter is divided using a number of periods since a last period during which the executing method was executed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
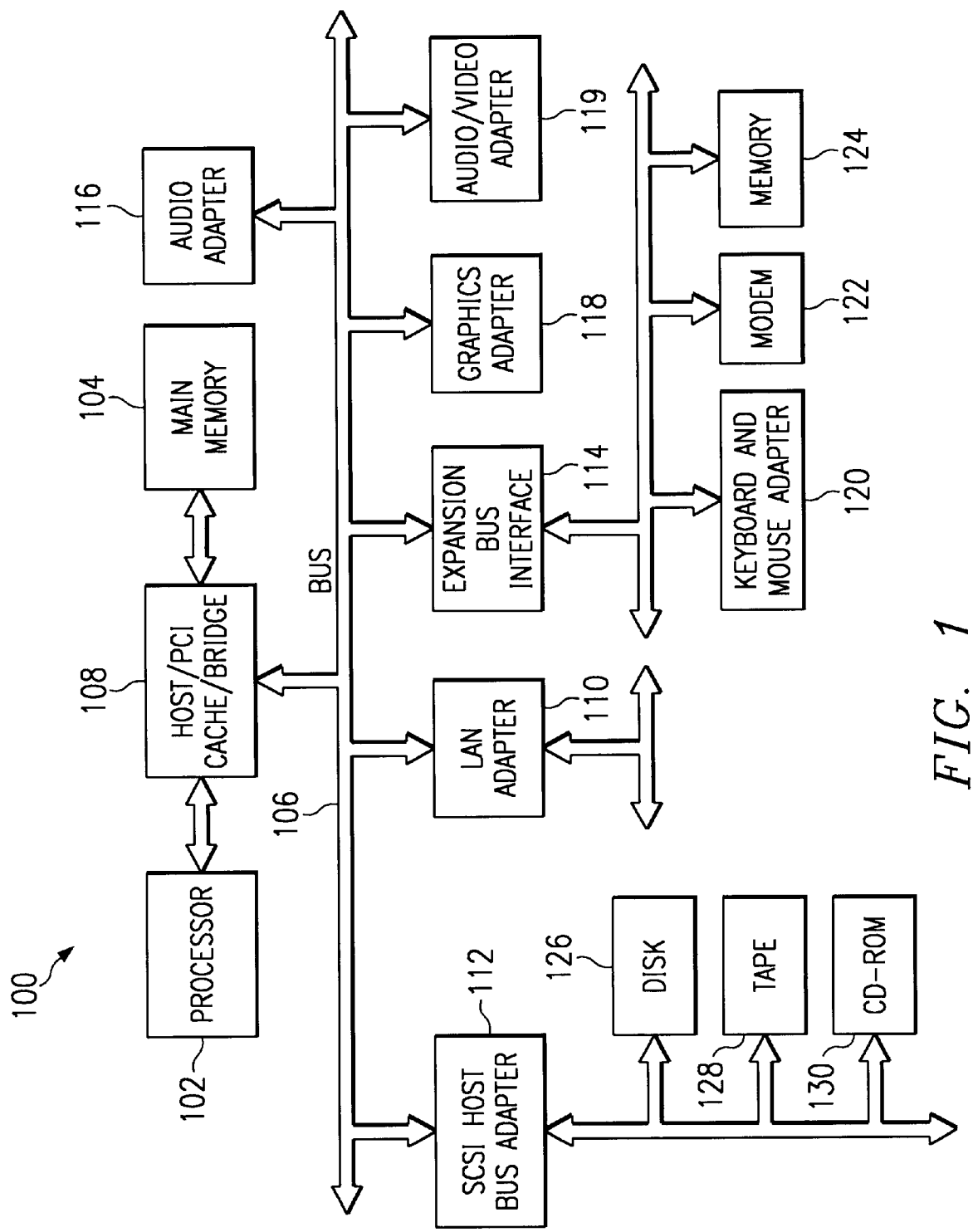
FIG. 1 is a block diagram of a data processing system in which the present invention may be implemented.

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors. Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention. The present invention provides a method, data processing system, and computer program product for identifying methods or routines that have consumed CPU processing time recently. One means of predicting how frequently a routine may be executed in the near future is by determining how frequently the routine is executed in the recent past. A technique for making such a determination may involve incrementing a counter when a method executes and periodically "sweeping" all such counters to reset or adjust them as time passes. For example, the counter may be divided by two at each sweep, providing for aging of the counts.

The counters may be updated using sampling (i.e. incremented for the method running at each timer tick) or may be rigorously maintained by incrementing for each invocation. Since it is important to determine not only the frequency of invocation but also the amount of time spent in the method, it may be necessary to count bytecode interpretation (very expensive in system resource) or branches taken (a bit more palatable). Sampling provides proportional time spent in a method with far less overhead albeit with reduced accuracy.

The sweep must be run periodically to adjust the counts so that they reflect recent activity. Otherwise, a method that accumulated millions of "ticks" early in the day could appear to be "hot" long after it became dormant. Because a typical system may have many thousand Java methods, the sweep is expensive. To combat this problem, a system designer may choose a longer period between sweeps. However, such a choice may be non-optimal for determining the truly hot methods.

Most recently used or most frequently accessed as used in the specification should be understood to mean frequent use, recently. As used, they are relative terms which are particular to a given situation. Using the weighting technique as described in the patent, the frequency of use is weighted by the recency of use to determine whether a particular method, routine or data is selected for inclusion in the limited resource. Using the example of the JIT compilation of potentially 60,000 to 100,000 Java methods, only perhaps 1,000 to 2,000 methods will fit in a JIT buffer of one megabyte. Therefore, in this situation, the invention is used to select the top 1,000 or so methods which are most frequently and recently used from the total available pool of methods. Of course, one skilled in the art would understand that in different embodiments of the invention a larger or smaller proportion of a total available pool of elements can be selected depending upon the relative size of total available pool and the limited resource.

The present invention employs a timer based sampling process to track executing methods and eliminates the need for global counter reset (sweep) by simulating a sweep in each method that is detected when sampling occurs. The present invention stores a timer in a method block, which contains information associated with a method or routine that is being monitored. Each time a timer interrupt occurs, each method that is running has its counter retrieved. Accordingly, each method that is running gains a higher aggregate number of times that it has been executing during an interrupt. For a more accurate reflection of use, each method's frequency of use is weighted by its recency of use such that methods being used more recently are more heavily weighted. As described above, this may include weighting the aggregate access count by the last time the method was accessed. Thus, when a timer interrupt occurs, the timer stored in the method block is subtracted from the current timer to determine how much time has passed. From this amount of time, the number of periods that have passed is determined. The number of periods is used to calculate the number of sweep periods used to simulate sweeps by further weighting the frequency of use by the recency of use. Depending upon the implementation, the entire timer may be stored in the method block. Of course, storage of the entire timer is not required for the present invention. A portion of the timer may be saved in the method block as described below in FIG. 2.

Figure 2:
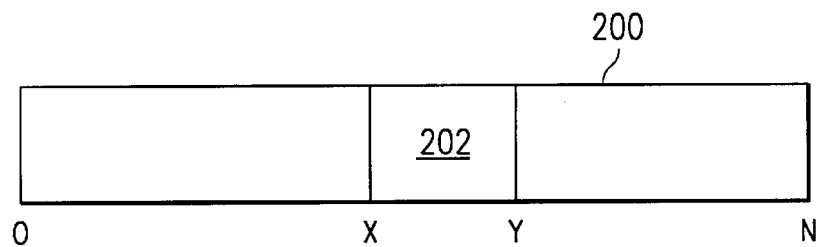
FIG. 2 is a diagram of a timer in accordance with a preferred embodiment of the present invention.

Turning now to FIG. 2, a diagram of a timer is depicted in accordance with a preferred embodiment of the present invention. A timer is used to initiate sampling of methods executing in a data processing system. Timer 200 is n bits in size and may be a hardware or a software timer. The timer is assumed to be increasing at a more or less fixed rate. In timer 200, x and y represent subsets of timer 200 in which y is the stepping rate that is more or less equal to the sweep period. The capacity of the timer is represented by X, which is in bits. The portion of timer 200 between X and Y form a subset timer 202. The distance between X and Y within timer 200 determines the capacity of subset timer 202. X is typically set to minimize wrapping within subset timer 202. X also is set based on the amount of storage available. In particular, the amount of storage available to store subset timer 202 may be such that a smaller than ideal subset timer 202 is stored to meet the limitations on available storage, resulting in occurrence of some wrapping. X and Y are saved into a method block, which is described below in FIG. 3.

Figure 3:
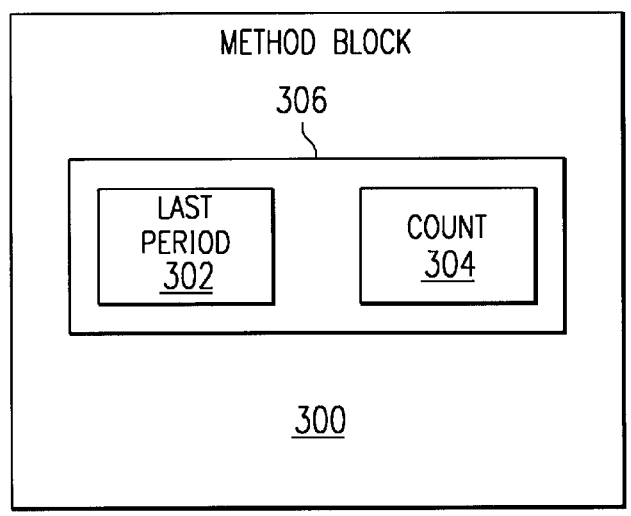
FIG. 3 is a diagram of a method block in accordance with a preferred embodiment of the present invention.

Turning next to FIG. 3, a diagram of a method block is depicted in accordance with a preferred embodiment of the present invention. Each method is associated with a method block, such as method block 300. A method block is a piece of storage defined within a class in the depicted example. Each method has its own method block in the depicted example. Method block 300 is used to store information that is needed to interpret, run, and test a method or routine. In addition, the present invention introduces a last period field 302 and a count field 304 located in counter 306 in method block 300. These fields are used in the processes of the present invention to track how recently and frequently a method has been executing. The process identifies methods that have consumed CPU time recently. In determining which methods have been run most recently frequently, each method that is to be monitored within the data processing system is tracked using last period field 302 and count field 304. In the depicted example, last period field 302 and count field 304 are contained within a counter in method block 300. Count field 304 is similar to a counter that could be used currently to identify currently and frequently run methods using a sweep of methods. Whereas the above description and associated figure describe a method block as the location of the last period and count fields, the invention could be practiced by locating these fields in some other control block or hash table. Indeed, such an alternate location would be necessary when using this invention for monitoring procedures other than Java method usage.

Figure 4:
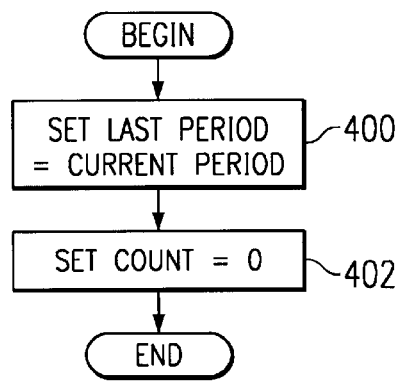
FIG. 4 is a flowchart for initializing a method in accordance with a preferred embodiment of the present invention.

With reference now to FIG. 4, a flowchart for initializing a method is depicted in accordance with a preferred embodiment of the present invention. The process in FIG. 4 is used to initialize a method so that the frequency and regency of execution of the method can be tracked using the processes of the present invention. The process begins by setting the last period field in the method equal to the current period (step 400). Thereafter, the count field is set equal to zero (step 402).

Figure 5:
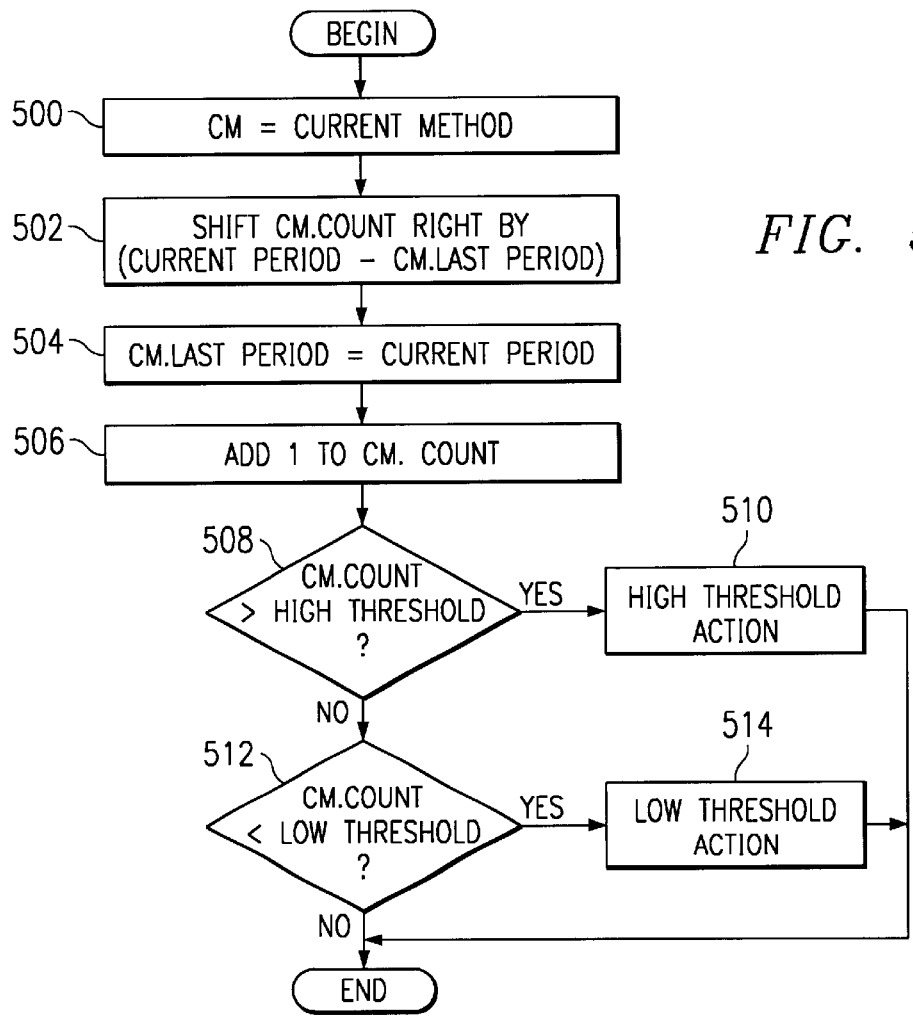
FIG. 5 is a flowchart of a process for sampling a method in response to a timer interrupt in accordance with a preferred embodiment of the present invention.

Turning now to FIG. 5, a flowchart of a process for sampling a method in response to a timer interrupt is depicted in accordance with a preferred embodiment of the present invention. Each time a timer interrupt occurs, each method that is running has its counter retrieved. The counter contains two fields as described above in FIG. 3. Last period field 302 represents the last time that this field was visited, e.g., either at initializing of the field or through a timer interrupt. Each method that had its counter retrieved must be credited with a higher frequency of use value. For a more accurate reflection of use, each method's frequency of use is weighted by its recency of use. In the present invention, last period field 302 is subtracted from the corresponding subset of the current timer 202 to determine the number of periods that have passed since the execution of this method was last detected. The number of periods may further be weighted by the recency of use. Although different types of timers may be implemented, the depicted example employs a hardware timer in which only a portion of the timer is saved in last period field 302. Alternatively, the entire timer may be saved in period field 302. In this case, the method for determining the numbers of elapsed periods would involve subtraction and division. Last period field 302 would be subtracted from the current timer to determine the amount of time that had elapsed and the result would be divided by the number of timer ticks that comprise the sweep period. In either case, the result, n, indicates the number of sweep periods that have passed since the method was last visited. Count field 304 is then adjusted to simulate n sweeps. For example, in the case where simulating a sweep that causes each count field to be divided by 2, the simulation of n sweeps would be accomplished by shifting count field 304 right n bits. The sweep simulation decreases the weight of the count field's frequency of use value according to recency of use. Thus, the frequency of use is weighted by the recency of use. Following the sweep adjustment, count field 304 is incremented by 1 and a determination is made as to whether an action should be taken. The count field 304 is incremented after the sweep simulation because the new increment's weight represents the most recent time the method could have run and thus, that count increment has a higher frequency of use as weighted by the recency of use. Thus, routines having a later last time of execution are weighted more heavily in the count field than routines having an earlier last time of execution. In the depicted example, the action may be scheduling just in time compilation of the method.

Still with reference to FIG. 5, the process begins by setting the variable CM equal to the current method (step 500). Thereafter, CM.Count is shifted right by Current_Period_CM.Last_Period (step 502). This step illustrates the subtraction of the sweep period from the portion of the system timer that represents the same period. Additionally in step 502, the value of the count field is shifted right by the difference to simulate n sweeps. In the depicted example, a counter is divided by two for each simulated sweep (shifting right by one simulates the division by two). Next, CM.Last_Period is set equal to the Current_Period (step 504). Step 504 basically saves the current period in last period field 302. The process then adds one to CM.Count, which is the count field for the current method (step 506).

Next, a determination is made as to whether CM.Count is greater than a high threshold value (step 508). If CM.Count is greater than the high threshold value, a high threshold action is taken (step 510) with the process terminating thereafter. For example, if CM.Count is greater than a selected threshold, an action, such as scheduling the method for JIT compilation in the case of a Java method. The selection of the threshold would depend on various factors, such as, for example, the amount of storage available and the aggressiveness selected to JIT a method. Of course, other actions may be taken depending on what is being monitored and the operating system environment For example, the invention could be used in a caching or page replacement process rather than selecting methods for JIT compilation).

If CM.Count is less than or equal to the high threshold, a determination is then made as to whether CM.Count is less than a low threshold value (step 512). If CM.Count is less than the low threshold value, a low threshold action is taken (step 514).

Various actions may be taken at a lower threshold value, for example scheduling the release of storage currently used to hold the compiled version of a method or the migration of a storage element (e.g., page or cached item) to a lower level of the storage hierarchy. Note, however, that low threshold actions are more likely to occur in response to the detection of resource shortage,described in FIG. 6.

Figure 6:
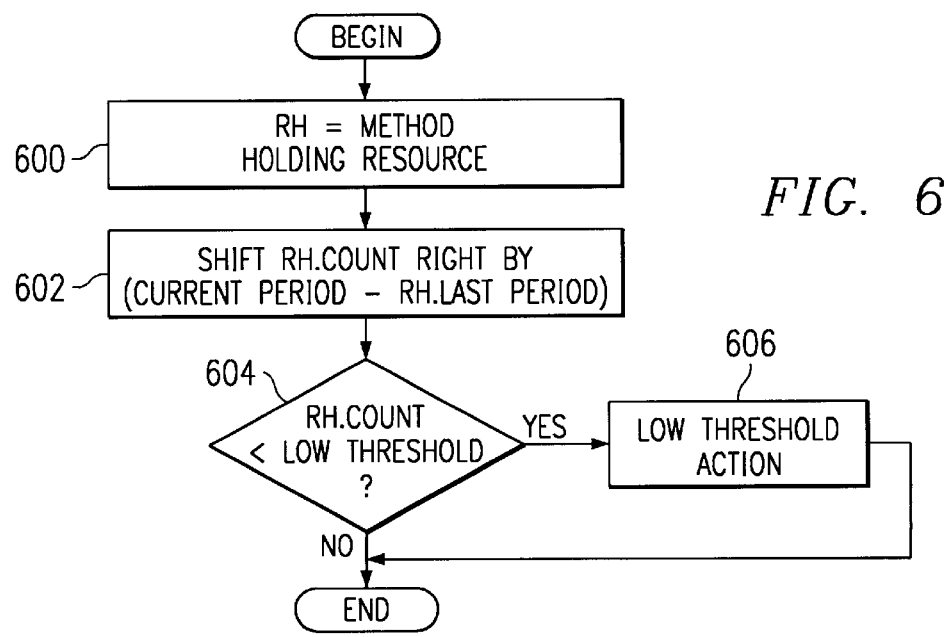
FIG. 6 is a flowchart of a process for identifying methods which have not been used frequently or recently.

FIG. 6 describes the process of determining the methods that have not been used recently and frequently, ie. low threshold detection. This process would most typically be employed in response to some critical resource shortage and would identify those holders of the critical resource that would be the best candidates for release of said resource.

With reference to FIG. 6, the process low threshold detection begins by identifying a holder of the critical resource, RH (step 600). Next, in step 602, the counter is adjusted to account for the time that has elapsed since the method was last seen to be executing. Note that this step is identical to step 502 of FIG. 5 where further details of this step may be found. In step 604, the adjusted count is compared to a low threshold value and if it is lower, step 606 is performed wherein, for example, the resource previously held by RH may be released.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, the processes of the present invention may be applied to other applications other than JIT compilation of bytecodes. In particular, the present invention also may be applied to migration of data in a storage hierarchy. For example, the processes described may be applied to caching and paging of data with a data processing system. In particular, the present invention may be used to identify how often data is used or accessed within the data processing system. Data which is frequently used or accessed would be kept in the cache. The embodiment was chosen and described in order to best explain the principles of the invention and the practical application to enable others of ordinary skill in the art to understand the invention for various embodiments with various modifications as are suited to the particular use contemplated.

What is claimed is:

1. A method for identifying recently and frequently used routines in a data processing system, the method comprising the steps of:

for a collection period, tracking an aggregate number of times each of a plurality of routines executes;

for the collection period, determining a last time each of the plurality of routines executes;

weighting the aggregate number of times each routine executes by the last time that the routine executed to produce a weighted aggregate execution count for each of the plurality of routines so that routines having a later last time of execution are weighted more heavily than routines having an earlier last time of execution; and selecting a number of routines from the plurality of routines as the more recently and frequently used routines according to the weighted execution counts.

2. The method of claim 1, wherein the number of routines are processed using JIT compilation.

3. The method of claim 1, wherein data associated with the number of routines are cached.

4. A method for identifying recent access of data collections within a data processing system, the method comprising the steps of:

for a collection period, tracking an aggregate number of times each of a plurality of data collections is accessed;

for the collection period, determining a last time each of the plurality of data collections was accessed;

weighting the aggregate number of times each data collection was accessed by the last time that the data collection was accessed to produce a weighted aggregate access count for each of the plurality of data collections so that data collections having a later last time of access are weighted more heavily than data collections having an earlier last time of access; and selecting a number of data collections from the plurality of data collections as the most recently and frequently used data collections according to the weighted access counts.

5. The method of claim 4, wherein the plurality data collections is a plurality of routines.

6. The method of claim 4, wherein the number of data collections are stored in a cache.

7. The method of claim 4, wherein the plurality of data collections are a plurality of pages.

\* \* \* \* \*

UNITED STATES PATENT AND TRADEMARK OFFICE
CERTIFICATE OF CORRECTION

PATENT NO.    : 6,249,912 B1
DATED         : June 19, 2001
INVENTOR(S)   : Blandy It is certified that error appears in the above-identified patent and that said Letters Patent is hereby corrected as shown below:

<u>Column 3,</u>
Line 23, after "dormant.", insert -- For example, the aggregate number of times each routine, or data collection, is accessed may be weighted by the last time that the routine or data collection was accessed to produce a weighted aggregate access count for each routine or data collection. In this exemplary embodiment, routines and data collections that have a later last time of access are weighted more heavily than routines and data collections having an earlier last time of access. --

Signed and Sealed this

Thirtieth Day of July, 2002

*Attest:*

*Attesting Officer*

JAMES E. ROGAN
*Director of the United States Patent and Trademark Office*